US012573280B2

(12) United States Patent
Cerutti et al.

(10) Patent No.: US 12,573,280 B2
(45) Date of Patent: Mar. 10, 2026

(54) SYSTEMS AND METHODS FOR TAMPER EVIDENT SECURING OF A MONITORING DEVICE TO AN INDIVIDUAL

(71) Applicant: BI Incorporated, Boulder, CO (US)

(72) Inventors: Justin Cerutti, Denver, CO (US); Tyrone Cunningham, Thornton, CO (US); Benjamin Barber, Superior, CO (US)

(73) Assignee: BI Incorporated, Boulder, CO (US)

( * ) Notice: Subject to any disclaimer, the term of this patent is extended or adjusted under 35 U.S.C. 154(b) by 120 days.

(21) Appl. No.: 18/654,466

(22) Filed: May 3, 2024

(65) Prior Publication Data

US 2025/0259523 A1 Aug. 14, 2025

Related U.S. Application Data

(60) Provisional application No. 63/553,043, filed on Feb. 13, 2024.

(51) Int. Cl.
*G08B 21/02* (2006.01)

(52) U.S. Cl.
CPC ................................ *G08B 21/0288* (2013.01)

(58) Field of Classification Search
CPC .................................................. G08B 21/0288
See application file for complete search history.

(56) References Cited

U.S. PATENT DOCUMENTS

| | | | |
|---|---|---|---|
| 4,221,063 A | 9/1980 | Charles et al. | |
| 5,504,474 A | 4/1996 | Libman et al. | |
| 2017/0157785 A1 | 6/2017 | Landau et al. | |
| 2018/0096239 A1 | 4/2018 | Vera Manero et al. | |
| 2021/0254372 A1 | 8/2021 | Lai et al. | |
| 2021/0287502 A1 | 9/2021 | Freathy | |
| 2023/0351881 A1* | 11/2023 | Lewinton | G06F 1/163 |

OTHER PUBLICATIONS

International Search Report issued in corresponding PCT Application No. PCT/US2025/015067, dated Apr. 4, 2025 (4 Pages).

Written Opinion of the International Searching Authority issued in corresponding PCT Application No. PCT/US2025/015067, dated Apr. 4, 2025 (13 pages).

* cited by examiner

*Primary Examiner* — An T Nguyen
(74) *Attorney, Agent, or Firm* — Osha Bergman Watanabe & Burton LLP

(57) ABSTRACT

Various embodiments provide systems and methods for securing a monitoring device to an individual, and more particularly to systems and methods for using a security attachment tool to secure a monitoring device to an individual.

20 Claims, 17 Drawing Sheets

SYSTEMS AND METHODS FOR TAMPER EVIDENT SECURING OF A MONITORING DEVICE TO AN INDIVIDUAL

CROSS REFERENCE TO RELATED APPLICATIONS

The present application claims priority to (is a non-provisional application of) U.S. Pat. App. No. 63/553,043 filed Feb. 13, 2024 by Cerutti et al. The entirety of the aforementioned reference is incorporated herein by reference for all purposes.

BACKGROUND OF THE INVENTION

Various embodiments provide systems and methods for securing a monitoring device to an individual, and more particularly to systems and methods for using a security attachment tool to secure a monitoring device to an individual.

Tracking devices have been attached to monitored individuals and provide an ability to automatically determine the location of the respective monitored individual. Such tracking devices can include, for example, location determination circuitry that depends upon, for example, signal reception from location satellites, WiFi devices, and/or transmitting beacons. The location services provide a location of the tracking device, and thus to identify the location of the individual the tracking device must be in proximity of the individual. Some approaches secure the tracking device to the individual, but the attachment mechanism can be overcome allowing for undetectable removal of the monitoring device. Such situation leaves monitoring personnel with the impression that the tracking information represents the location of the individual when it does not.

Thus, for at least the aforementioned reasons, there exists a need in the art for more advanced approaches, devices and systems for ensuring detectability of tamper with a mechanism securing the monitoring device to an individual.

BRIEF SUMMARY OF THE INVENTION

Various embodiments provide systems and methods for securing a monitoring device to an individual, and more particularly to systems and methods for using a security attachment tool to secure a monitoring device to an individual.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

and

Figure 9:
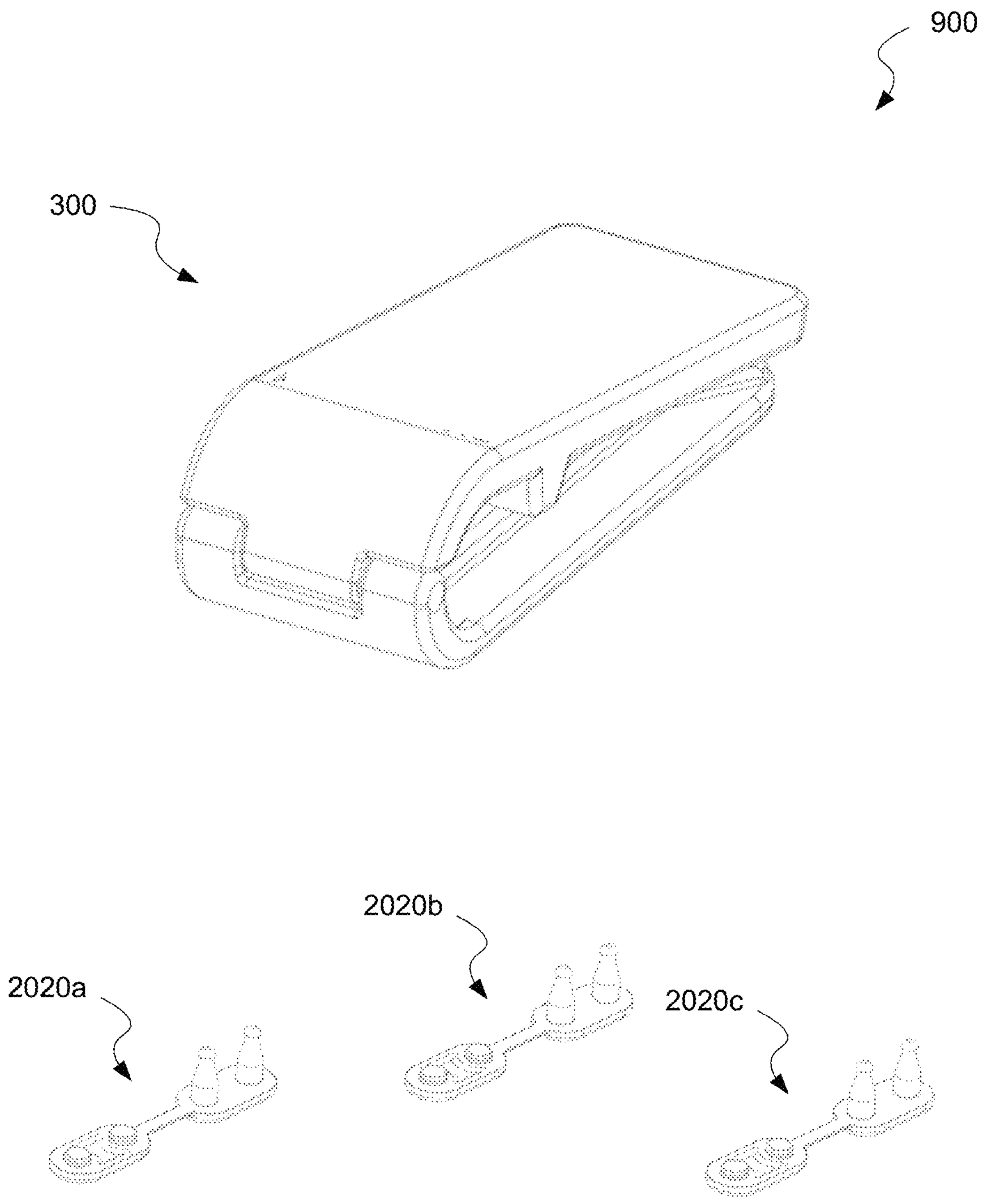

FIG. 9 shows a monitoring device securing kit in accordance with various embodiments.

DETAILED DESCRIPTION OF THE INVENTION

Various embodiments provide systems and methods for locating a tracking device involving selective use of non-associated devices.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "cell" includes reference to one or more of such cells.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the elements shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Various embodiments provide methods for securing a monitoring device to a monitored individual. The methods include inserting a securing buckle into a connection tool. The connection tool includes a channel tailored to accept the securing buckle. The securing buckle includes a first buckle end and a second buckle end connected by a center area. The first buckle end includes at least one male connector, and the second buckle end includes at least one female connector. The methods further include: moving the connection tool between a limb of the of the monitored individual and an attachment element of the monitoring device, where the attachment element of the monitoring device is connected to the monitoring device and surrounds the limb of the monitored individual; inserting the at least one male connector through a hole in the attachment element; closing the connection tool to bend the center area of the securing buckle and hold the at least one female connector in contact with the at least one male connector, where the center area of the securing buckle extends from a first face of the attachment element to a second face of the attachment element; and pressing the connection tool to force the at least one male connector into the at least one female connector and securing the attachment element in place.

In some instances of the aforementioned embodiments, the securing buckle has a shape defined by a combination of the first buckle end, the second buckle end, and the center area; and wherein the first buckle end and the second buckle end are both wider than the center area. In some such instances, the channel tailored to accept the securing buckle includes a first channel area, a second channel area, and a center channel area extending between the first channel area and the second channel area. The center channel area is narrower than either of the first channel area or second channel area. In various cases, the first channel area corresponds in size to the first buckle end, the second channel area corresponds in size to the second buckle end, and the center channel area corresponds in size to the center area.

In various instances of the aforementioned embodiments, the attachment element has a first attachment element end and a second attachment element end. The first attachment element end includes at least a first hole, the second attachment element end includes at least a second hole, and the hole in the attachment element includes the first hole and the second hole. In some such instances, the methods further include: wrapping the attachment element around the limb of the individual and aligning the first attachment element end with the second attachment element end such that the first attachment element hole is adjacent the second attachment element hole. In various such instances, the at least one male connector is a first male connector, the at least one female connector is a first female connector, the first buckle end includes a second male connector, the second buckle end includes a second female connector, the hole is a first hole, and the attachment element includes a second hole. In such instances, the methods may further include inserting the second male connector through the second hole in the attachment element. Closing the connection tool brings the first female connector into contact with the first male connector and the second female connector into contact with the second male connector.

In some instances of the aforementioned embodiments, the at least one male connector includes a tip area that is narrower at an end of the at least one male connector than at a first interim location along the at least one male connector, the at least one male connector is broader at the first interim location than at a second interim location along the at least one male connector, and the first interim location is closer to the end of the at least one male connector than the second interim location. In some such instances, the first interim location is broader than an opening in the at least one female connector, and wherein upon pressing the connection tool to force the at least one male connector into the at least one female connector forces the first interim location through the at least one female connector such that the at least one male connector cannot be removed from the at least one female connector without damaging the at least one male connector. In various such instances, the first interim location is broader than an opening in the at least one female connector, and wherein upon pressing the connection tool to force the at least one male connector into the at least one female connector forces the first interim location through the at least one female connector such that the at least one male connector cannot be removed from the at least one female connector without damaging at least one of: the at least one male connector, the at least one female connector, and/or the attachment element.

In various instances of the aforementioned embodiments, the monitoring device includes a location detection circuit configured to determine a location of the monitoring device. In some such instances, the location detection circuit supports one or more location determination processes including, but not limited to, a global navigation satellite system based location detection, an advanced forward link trilateration based location detection, and/or a WiFi based location detection.

In one or more instances of the aforementioned embodiments, at least a central portion of the at least one male connector is electrically conductive and configured to complete an electrical connection from one location of the monitoring device to another end of the monitoring device. Such an electrical connection may be used, for example, to determine whether the monitoring device has been removed based upon a detected discontinuity of the electrical connection.

Other embodiments provide monitoring device kits including a connection tool and a plurality of securing buckles.

Yet other embodiments provide methods for securing a monitoring device to a monitored individual. The methods include providing a monitoring device that includes: a location detection circuit configured to determine a location of the monitoring device; a wireless transmitter configured to transmit the location of the monitoring device to a recipient; a battery supplying power to the location detection circuit and the transmitter; and an attachment element having a first attachment element end and a second attachment element end, and where the first attachment element end has a first attachment element hole and the second attachment element end has a second attachment element hole. The methods further include: inserting a securing buckle into a connection tool, where the connection tool includes a channel tailored to accept the securing buckle, where the securing buckle includes a first buckle end and a second buckle end connected by a center area, where the first buckle end includes at least one male connector, and where the second buckle end includes at least one female connector; moving the connection tool and the attachment element such that the attachment element is around a limb of a monitored individual, and the connection tool is between the limb of the of the monitored individual and the attachment element of the monitoring device; inserting the at least one male connector through the first attachment element hole and the second attachment element hole; closing the connection tool to the at least one female connector in contact with the at least one male connector, wherein the center area of the attachment element extends from a face of the first end of the attachment element to a face of the second end of the attachment element; and pressing the connection tool to force the at least one male connector into the at least one female connector and securing the attachment element in place.

Figure 1A:
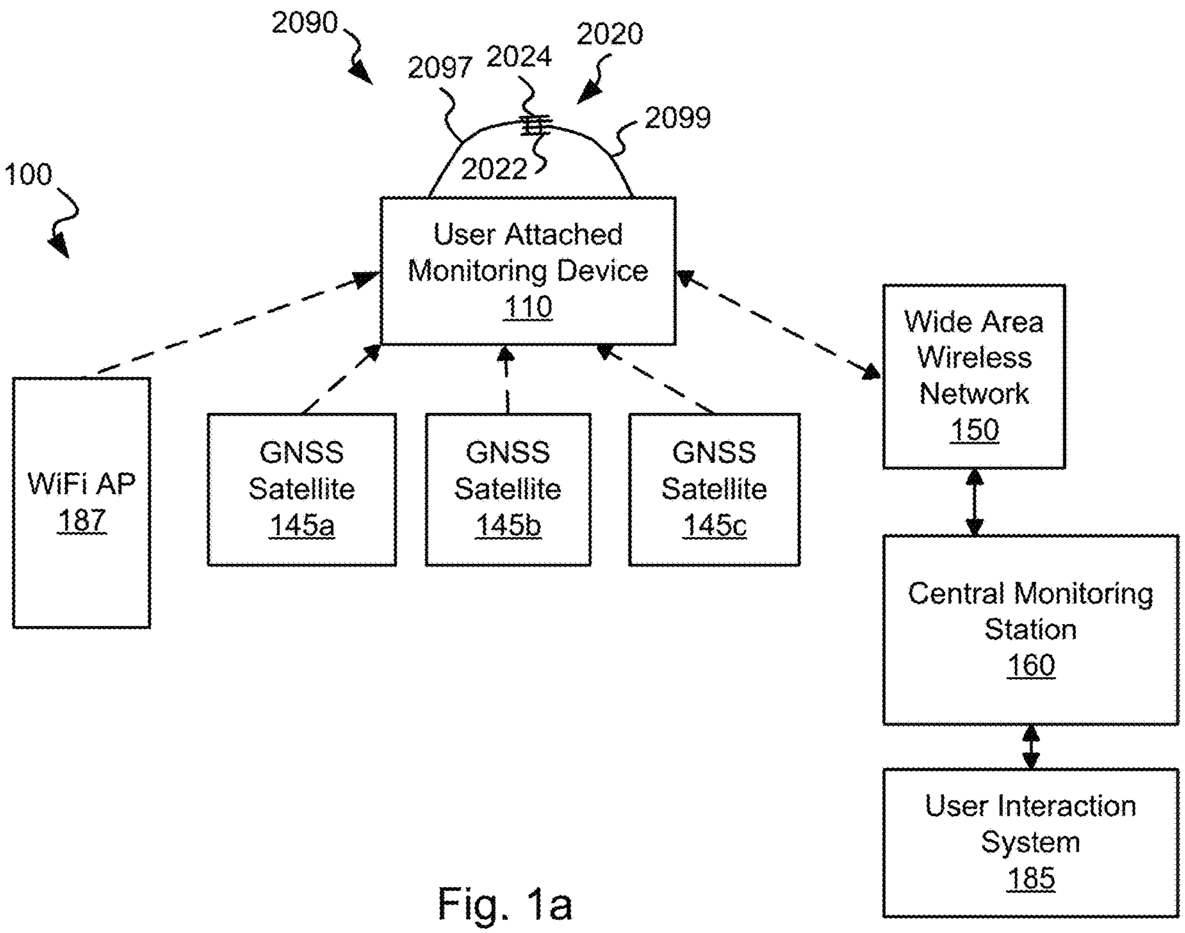
FIG. 1A-1C are block diagrams illustrating a location monitoring system that includes a user attached monitoring device having a strap secured using a securing buckle in accordance with various embodiments.

Turning to FIG. 1A, a block diagram illustrates a monitoring system 100 including a user attached monitor device 110 and a central monitoring station 160. Central monitoring station 160 is wirelessly coupled to user attached monitor device 110 via one or more wide area wireless (e.g., cellular telephone network, Internet via a WiFi access point, or the like) communication networks 150. User attached monitor device 110 includes an attachment element 2090 with a first end 2097 and a second end 2099. Each of first end 2097 and second end 2099 includes one or more holes through which a male connector of a securing buckle 2020 may pass. When securing buckle 2020 is installed, first end 2097 overlaps second end 2099 such that the one or more holes align, and corresponding male connectors extending from a first side 2025 of securing buckle 2020 pass through the aligned one or more hole in first end 2097 and second end 2099, and into corresponding female connectors of a second side 2024 of securing buckle 2020. In some cases, an electrically conductive material passes through a middle area of attachment element 2090 and connects to different locations of user attached monitor device 110. One or more of the male connectors extending from the first side 2025 of securing buckle 2020 may include an electrically conducive portion that acts to complete an electrical connection extending through attachment element 2090 when the male connector(s) is installed. Thus, with the male connector(s) installed, an electrical signal can be passed by user attached monitor device from one end of attachment element 2090 to another end of attachment element 2090 where it is received by user attached monitor device 110 at another location. Where user attached monitor device detects a discontinuity in the previously established electrical connection, it provides an indication that user attached monitor device 110 may have been removed by either cutting attachment element 2090 or removing the male connector(s).

Central monitoring station 160 may be any location, device or system where location data and/or other types of data are received, including by way of non-limiting example: a cellular/smart phone, an email account, a website, a network database, and a memory device. The location data and/or other types of data are stored by central monitoring station 160 and are retrievable by a monitoring individual, such as a parent, guardian, parole officer, court liaison, spouse, friend, or other authorized group or individual. In this manner, the monitoring individual is able to respond appropriately to detected activity of a monitored individual. In some cases, the monitoring individual is able to retrieve the location data and/or other data types via a user interaction system 185 which may be, but is not limited to, a network connected user interface device communicatively coupled via a network to central monitoring station 160 and/or directly to user attached monitor device 110 via wide area wireless network 150.

Central monitoring station 160 may include a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the monitored individual in accordance with the described embodiments. In particular, the interactive web portals may enable the monitor to retrieve the location and user identification data of one or more monitored individuals, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website or mobile application accessible via a software application on a mobile device (e.g. smart phone). The mobile website may be a modified version of the server supported website with limited or additional capabilities suited for mobile location monitoring.

User attached monitor device 110 includes a location sensor that senses the location of user attached monitor device 110 and generates corresponding location data. For example, when user attached monitor device 110 is capable of receiving wireless global navigation satellite system (hereinafter "GNSS") location information 136, 138, 139 from a sufficient number of GPS or GNSS satellites 145 respectively, user attached monitor device 110 may use the received wireless GNSS location information to calculate or otherwise determine the location of a human subject to which user attached monitor device 110 is attached. Global positioning system (hereinafter "GPS) is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone-based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS or GNSS satellites 145 via respective communication links 136, 138, 139. The location data and/or other data gathered by user attached monitor device 110 is wirelessly transmitted to central monitoring station 160 via wide area wireless network 150 accessed via a wireless link 135.

Further, user attached monitor device 110 includes WiFi based location determination circuitry that is configured to communicate with one or more WiFi access points 187, and based thereon to determine location of user attached monitor device 110.

Figure 1B:
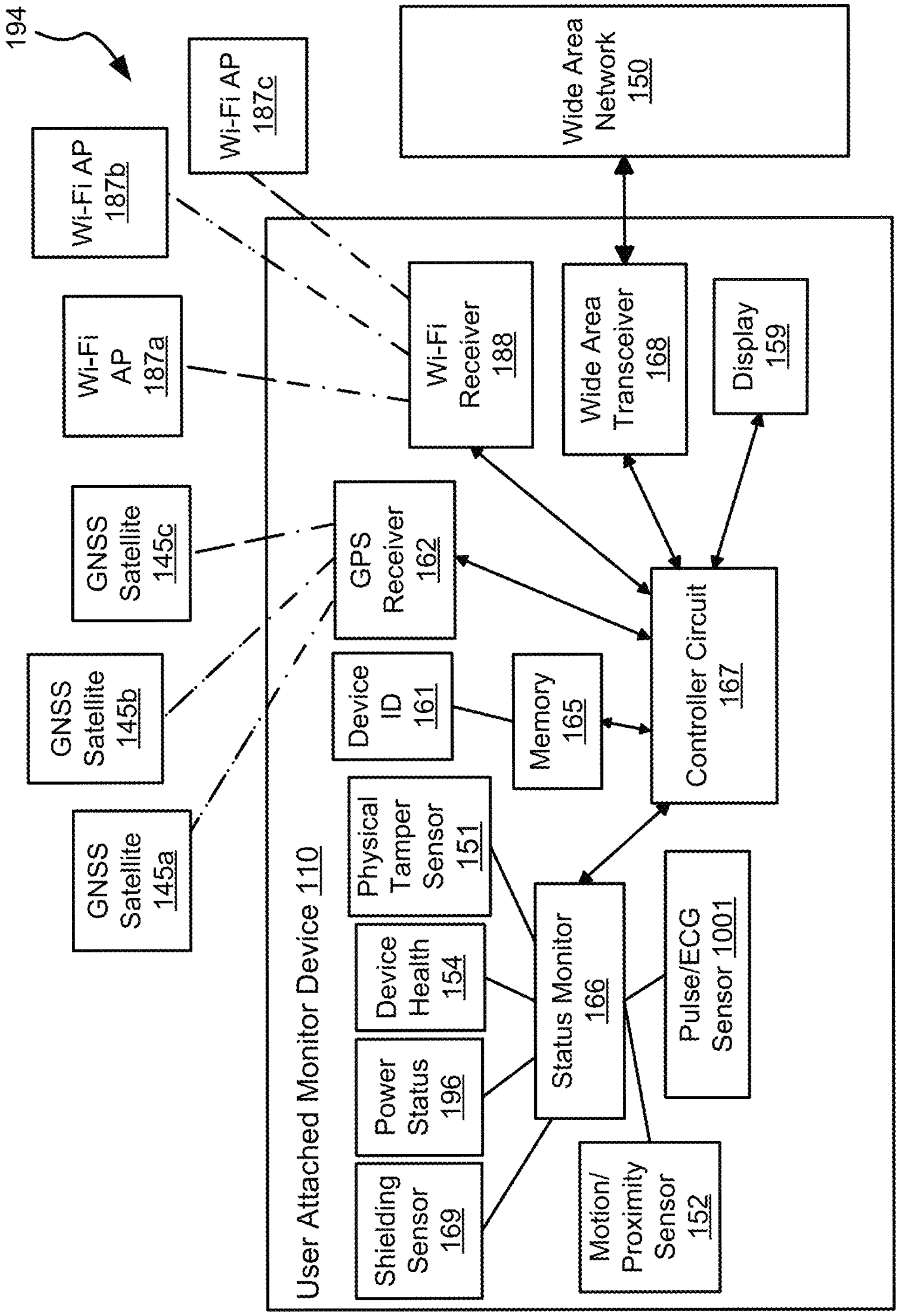

Turning to FIG. 1B, a block diagram 194 of user attached monitor device 110 is shown in accordance with some embodiments. As shown, user attached monitor device 110 includes a device ID 161 that may be maintained in a memory 165 and is thus accessible by a controller circuit 167. Controller circuit 167 interacts with a GPS receiver 162 and memory 165 at times for storing and generating records of successively determined GPS locations. Similarly, controller circuit 167 interacts with a WiFi receiver 188 and memory 165 at times for storing and generating records of successively determined WiFi access point identifications and signal strength. In some cases, memory 165 may include instructions (e.g., software-based or firmware-based instructions) executable by controller circuit 167 to perform and/or enable various functions associated with user attached monitor device 110. As user attached monitor device 110 comes within range of one or more WiFi access points (e.g., a WiFi access point 187*a*, a WiFi access point 187*b*, and/or a WiFi access point 187*c*), WiFi receiver 188 senses the signal provided by the respective WiFi access points, and provides an identification of the respective WiFi access point and a signal strength of the signal received from the WiFi access point to WiFi receiver 188. This information is provided to controller circuit 167 which stores the information to memory 165.

Where user attached monitor device 110 is operating in a standard mode, controller circuit 167 causes an update and reporting of the location of user attached monitor device 110 via a wide area transceiver 168 and wide area communication network 150. In some embodiments, wide area transceiver 168 is a cellular telephone transceiver. In some cases, the location data is time stamped. In contrast, where user attached monitor device 110 is within range of a public WiFi access point, reporting the location of user attached monitor device 110 may be done via the public WiFi access point in place of the cellular communication link.

Which technologies (e.g., GNSS and/or WiFi) are used to update the location of user attached monitor device 110 may be selected either by default, by programming from central monitor station 160, or based upon conditions detected in user attached monitor device 110 with corresponding predetermined selections. For example, it may be determined whether sufficient battery power as reported by power status 196 remains in user attached monitor device 110 to support a particular position determination technology.

In some cases, a maximum cost of resolving location may be set for user attached monitor device 110. For example, resolving WiFi location data or via a non-associated device may incur a per transaction cost to have a third-party service provider resolve the location information. When a maximum number of resolution requests have been issued, the WiFi position determination technology or the non-associated device approach may be disabled.

Further, it may be determined whether the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, WiFi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon a zone in which a tracking device is located. Some zones may be rich in WiFi access points and in such zones WiFi technology may be used. Otherwise, another technology such as cell tower triangulation or GPS may be used. Based upon the disclosure provided herein, one of ordinary skill in the art will recognize other scenarios and corresponding combinations of technologies may be best.

Controller circuit 167 of user attached monitor device 110 at times functions in conjunction with wide area transceiver 168 to send and receive data and signals through wide area communication network 150. This link at times is useful for passing information and/or control signals between a central monitoring system 160 and user attached monitor device 110. The information transmitted may include, but is not limited to, location information, measured alcohol information, one or more passive or active impairment tests applied to the monitored individual, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user attached monitor device 110, and of the individual to which it is attached. For example, a status monitor 166 may include one or more of the following subcomponents: power status sensor 196 capable of indicating a power status of user attached monitor device 110, and/or a pulse/ECG sensor 1001 operable to sense pulse rate of the monitored individual and an electrocardiogram unique to the monitored individual based upon electrodes (not shown) in contact with the skin of the monitored individual. The power status may be expressed, for example as a percentage of battery life remaining. Based upon the disclosure provided herein, one of ordinary skill in the art will recognize a variety of forms in which power status may be expressed. The pulse rate may be expressed in beats per minute and the ECG may be shown visually via display 159. Based upon the disclosure provided herein, one of ordinary skill in the art will recognize a variety of forms in which pulse rate and/or ECG rate may be expressed.

In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 151 capable of determining whether unauthorized access to user attached monitor device 110 has occurred or whether user attached monitor device 110 has been removed from an associated individual being monitored, and/or a motion/proximity sensor 152 capable of determining whether user attached monitor device 110 is moving and/or whether it is within proximity of an individual associated with user detached monitor device (not shown-see FIG. 3) associated with the monitored individual. In some cases, motion/proximity sensor 152 includes one or more accelerometer sensors and/or vibration gyro sensors that are capable of accurately sensing motion of the monitored individual. In addition, motion/proximity sensor 152 includes sensors capable of determining a proximity of user attached monitor device 110 to a monitored individual to which the device is assigned. This information may be used to assure that the monitored individual is wearing user attached monitor device 110. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

In some embodiments, a user input (not shown) may be integrated into a display 159 and allows for a user of user attached monitor device 110 to provide information to user attached monitor device 110. Display 159 is communicatively coupled to controller circuit 167.

Figure 1C:
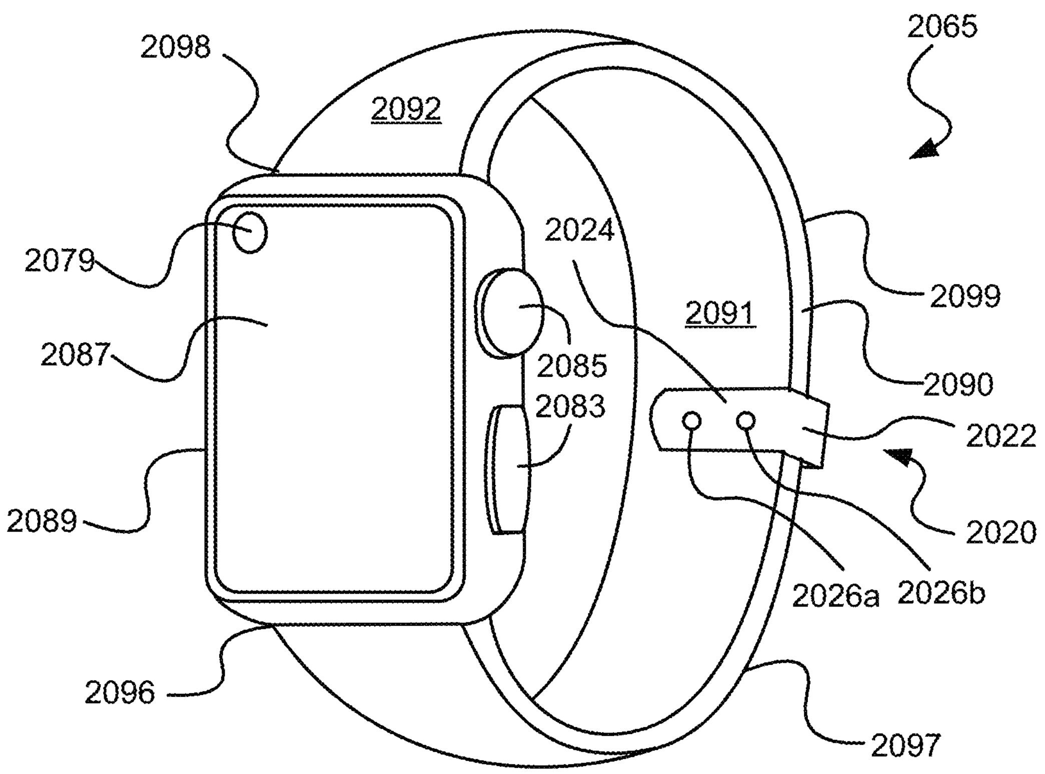

Turning to FIG. 1C, a user attached monitor device 2065 is shown with attachment element 2090 connected at opposite ends of user attached monitor device 2065 (i.e., a first end 2096 of user attached monitor device 2065 and a second end 2098 of user attached monitor device 2065). User attached monitor device 2065 is one example implementation of user attached monitor device 110 of FIGS. 1A-1B, or user attached monitor device 210 of FIG. 2. Attachment element 2090 has an outer surface 2092 and an inner surface 2091. Attachment element 2090 is operable to securely attach a user attached monitor device 2065 to a limb of a monitored individual in accordance with some embodiments. In some cases, attachment element 2090 is tailored to attach to a wrist of a monitored individual. In various embodiments, attachment element 2090 includes electrically conductive material used to make a conductive connection from first end 2096 to second end 2098 through attachment element 2090 and is used in relation to determining whether user attached monitor device 2065 remains attached and/or has been tampered with. In some such instances, connection from first end 2096 to second end 2098 via the electrically coupled element is made by an electrically coupled male connector(s) (not shown) included as part of securing buckle expending through attachment element 2090 and secured to one or more of female connectors 2026*a*, 2026*b* of a side 2024 of securing buckle 2020. A center area 2022 of securing buckle 2020 connects side 2024 of securing buckle 2020 to another side 2028 of securing buckle 2020. Side 2028 of securing buckle 2020 is not shown in this drawing as it is on the opposite side of attachment element 2090. Thus, for example, where attachment element 2090 is cut or the male connectors pulled out, the conductive connection is broken indicating a tamper has occurred. While FIG. 1C shows a strap as an example attachment element, based upon the disclosure provided herein, one of ordinary skill in the art will recognize other types of attachment elements that may be used in relation to different embodiments. In other embodiments, attachment element 2090 is long enough to attach around the torso of the monitored individual and is sufficiently flexible to allow expansion and contraction of the chest of the monitored individual as they breath. Such expansion and contraction may be used to sense respiration rate of the monitored individual.

User attached monitor device 2065 includes a case 2089 in which various electronic components are maintained. In addition, user attached monitor device 2065 includes a button 2083, a radial dial 2085, a display 2087 (which may be a touchscreen display), and a combination speaker, microphone, and image sensor 2079. Together, user attached monitor device 2065 includes a button 2083, a radial dial 2085, a display 2087, a combination speaker, microphone, and image sensor 2079 provide the user interface for user attached monitor device 2065 and support the functionality of the various sensors discussed above in relation to FIG. 1B. Based upon the disclosure provided herein, one of ordinary skill in the art will recognize a variety of inputs and outputs that may be incorporated into user attached monitor device 2065 to provide the functionality discussed herein.

Figure 2:
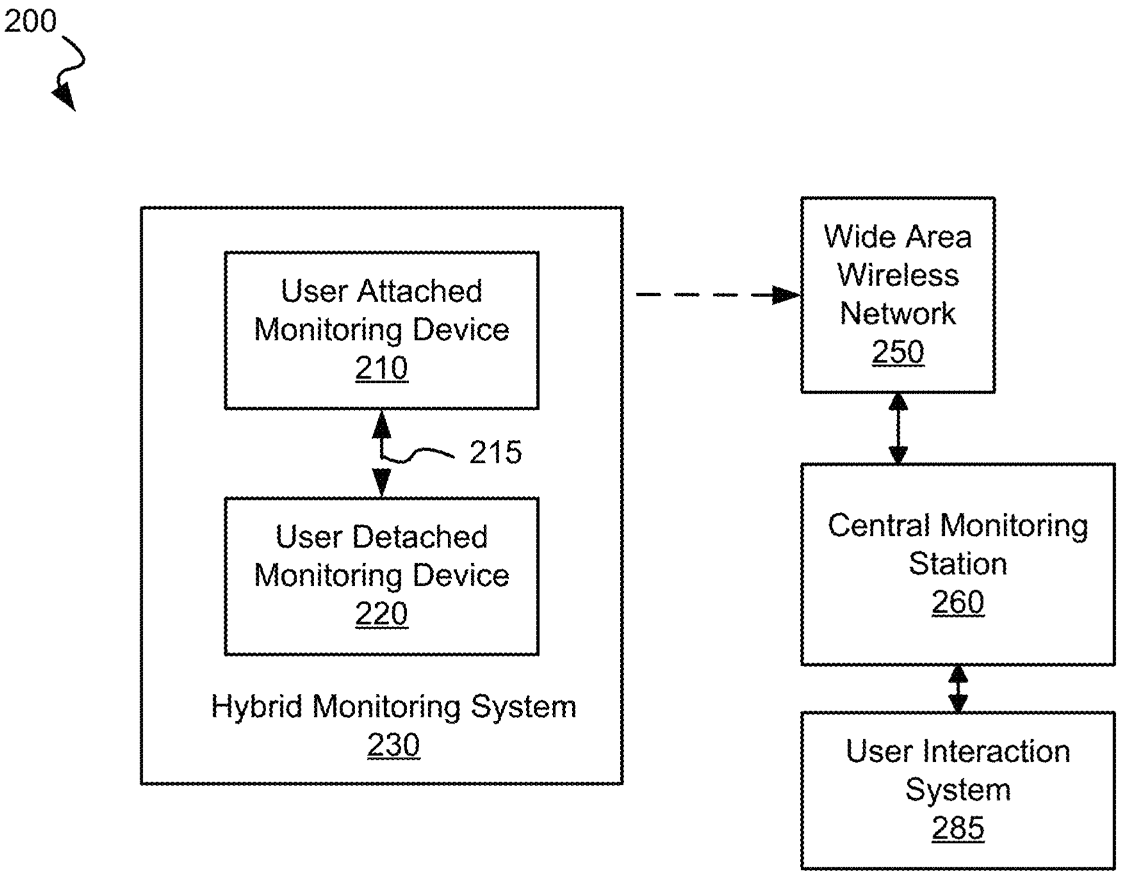
FIG. 2 is a block diagram of a location monitoring system including a hybrid monitoring system including a user attached monitor device secured to a monitored individual using a securing buckle in accordance with various embodiments.

Turning to FIG. 2, a block diagram is shown of a location monitoring system 200 including a hybrid monitoring system 230 capable of establishing location using one or more of WiFi access point-based location determination circuitry, satellite-based location determination circuitry, and/or non-associated device-based location determination circuitry in accordance with various embodiments. Hybrid monitoring system 230 includes both a user attached monitor device 210 and a user detached monitor device 220. User attached monitor device 210 is similar to either user attached monitor device 110.

User detached monitor device 220 is portable and may be any device that is recognized as being used by or assigned to an individual being monitored, but is not physically attached to the individual being monitored by a tamper evident attaching device. User detached monitor device 120 may be, but is not limited to, a cellular or mobile telephone configured to communicate with user attached monitor device 210 via a local communication link 215. In contrast, user attached monitor device 210 is attached to the individual being monitored using a tamper evident attaching device like a strap. User attached monitor device 210 may be, but is not limited to, a tracking device that is attached around the limb of an individual and includes indicators to monitor whether the device has been removed from the individual or otherwise tampered.

Location monitoring system 200 further includes a central monitoring station 260 wirelessly coupled to user attached monitor device 210 and/or user detached monitor device 220 via one or more wide area wireless (e.g., cellular telephone network, Internet via a Wi-Fi access point, or the like) communication networks 250.

User detached monitor device 220 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. The aforementioned location data is utilized verify the location of a user associated with user detached monitor device 220 at various points as more fully discussed below. User detached monitor device 220 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 220 corresponds to the target.

The location data and/or other data gathered by user detached monitor device 220 may be wirelessly transmitted to central monitoring station 260 via wide area wireless network. Central monitoring station 260 may be any location, device or system where the location data is received, including by way of non-limiting example: a cellular/smart phone, an email account, a website, a network database, and a memory device. The location data is stored by central monitoring station 260 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 285 which may be, but is not limited to, a network connected user interface device communicatively coupled via a network to central monitoring station 260 and/or directly to user detached monitor device 220 via wide area wireless network 250.

User detached monitor device 220 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 260 via a wireless transmitter communicatively coupled to the user identification sensor. The user identification data is stored in association with the location data by central monitoring station 260 and is retrievable therefrom by a monitor, such as a parent, guardian, parole officer, court liaison, spouse, friend, or other authorized group or individual. The monitor is configured to retrieve the location data via a network connected user interface device communicatively coupled—via the network—to central monitoring station 260 and/or to user detached monitor device 220. The location data may be transmitted to central monitoring station 260 independent of the user identification data, for example, during a periodic check-in with central monitoring system 260.

User detached monitor device 220 may further comprise a memory communicatively coupled to a control unit—which is also communicatively coupled to the location sensor, the identification sensor and the wireless transceiver—for controlling the operations thereof in accordance with the functionalities described herein. The memory may include instructions (e.g., software of firmware based instructions) executable by the control unit to perform and/or enable various functions associated with user detached monitor device 220. As user detached monitor device 220 is portable, each of the components may be located within, immediately adjacent to, or exposed without, a device housing whose dimensions are such that user detached monitor device 220 as a whole may be discretely carried by the user, for example, within a pocket or small purse.

Figure 3A:
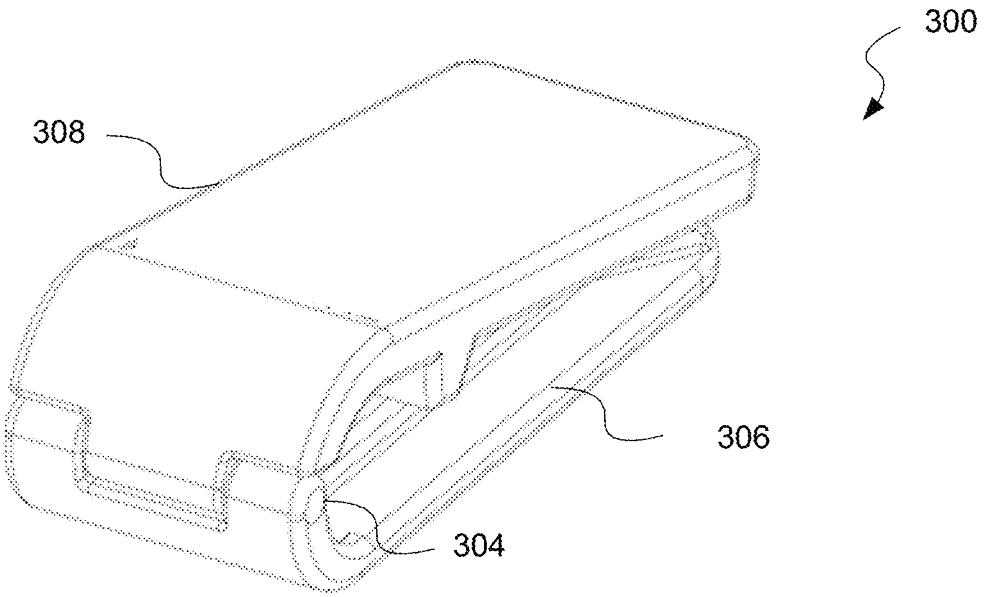
FIGS. 3A-3E show a connection tool in accordance with various embodiments.

Turning to FIG. 3A, a connection tool 300 is shown in accordance with various embodiments. In some embodiments, connection tool 300 may be formed of plastic. Based upon the disclosure provided herein, one of ordinary skill in the art will recognize a variety of materials from which connection tool 300 may be formed. Connection tool 300 is shown in a closed configuration where a first side 308 of connection tool 300 is brought near to a second side 306 of connection tool 306. First side 308 moves relative to second side 306 about a pivot 304 or axis.

Figure 3B:
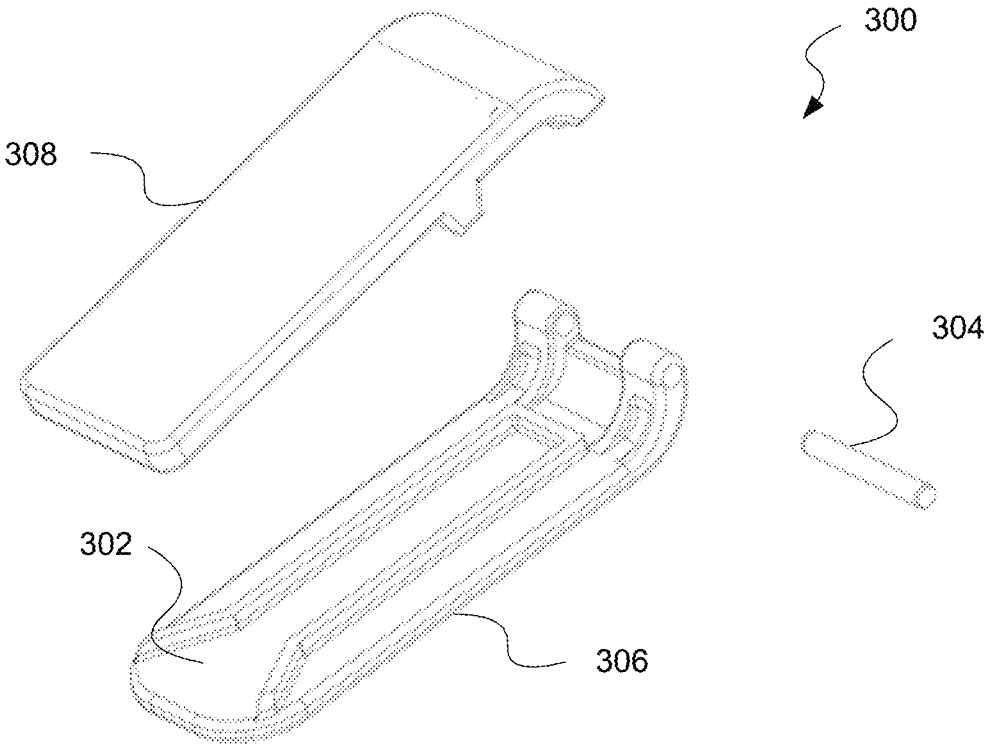

Turning to FIG. 3B, connection tool 300 is shown in a disassembled configuration where pivot 304 is removed resulting in side 306 separating from side 308. As shown, side 306 includes a channel 302 tailored to accept a securing buckle 2020 (not shown). In the depicted embodiment channel 302 is sized such that it has a length corresponding to a length of the securing buckle 2020 and a width to accommodate a width of securing buckle 2020. In other embodiments, channel 302 has a shape defined by a combination of a first buckle end, a second buckle end, and a center area of securing buckle 2020. In some such embodiments, channel 302 is sized such that it includes a first channel area, a second channel area, and a center channel area extending between the first channel area and the second channel area and located in side 306. The center channel area is narrower than either of the first channel area or second channel area.

Figure 3C:
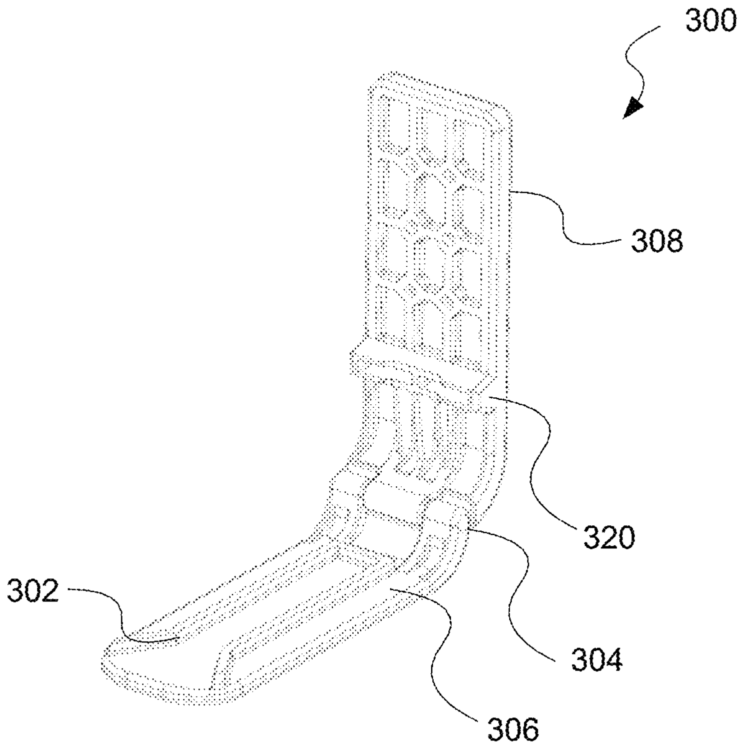

Turning to FIG. 3C, connection tool 300 is shown in an open configuration where first side 308 of connection tool 300 is moved away from second side 306 of connection tool 306. Again, first side 308 moves relative to second side 306 about a pivot 304 or axis. Side 308 includes a pressure element 320 configured to put pressure at a defined location on securing buckle 2020 when side 308 is closed onto side 306 and sides 306, 308 are pressed together.

Figure 3D:
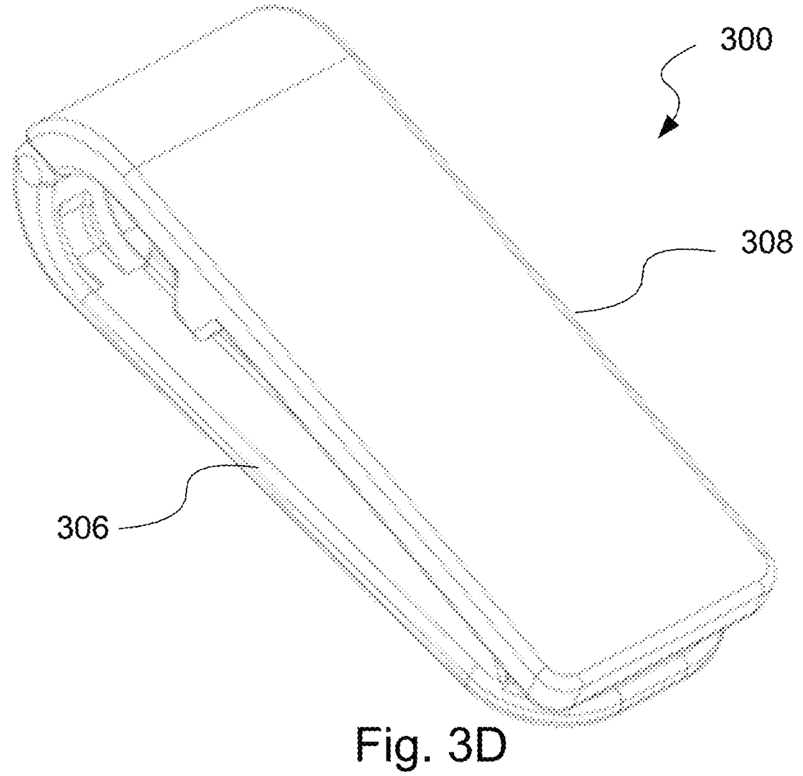
Figure 3E:
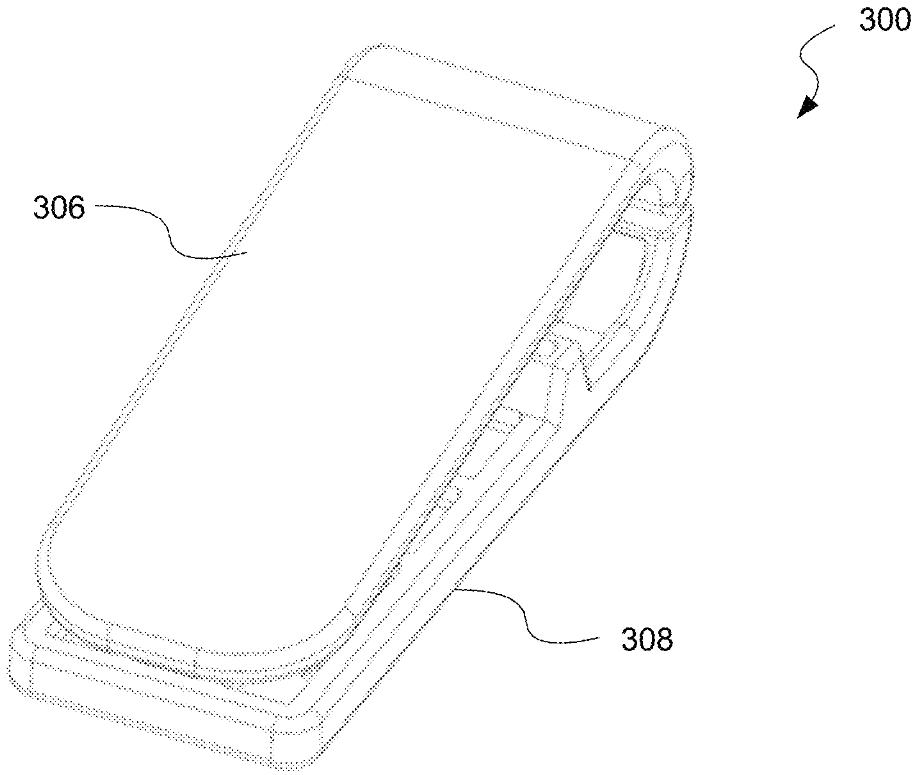

Turning to FIG. 3D, connection tool 300 is shown in a closed configuration with side 308 up. Turning to FIG. 3E, connection tool 300 is shown in a closed configuration with side 306 up.

Figure 4:
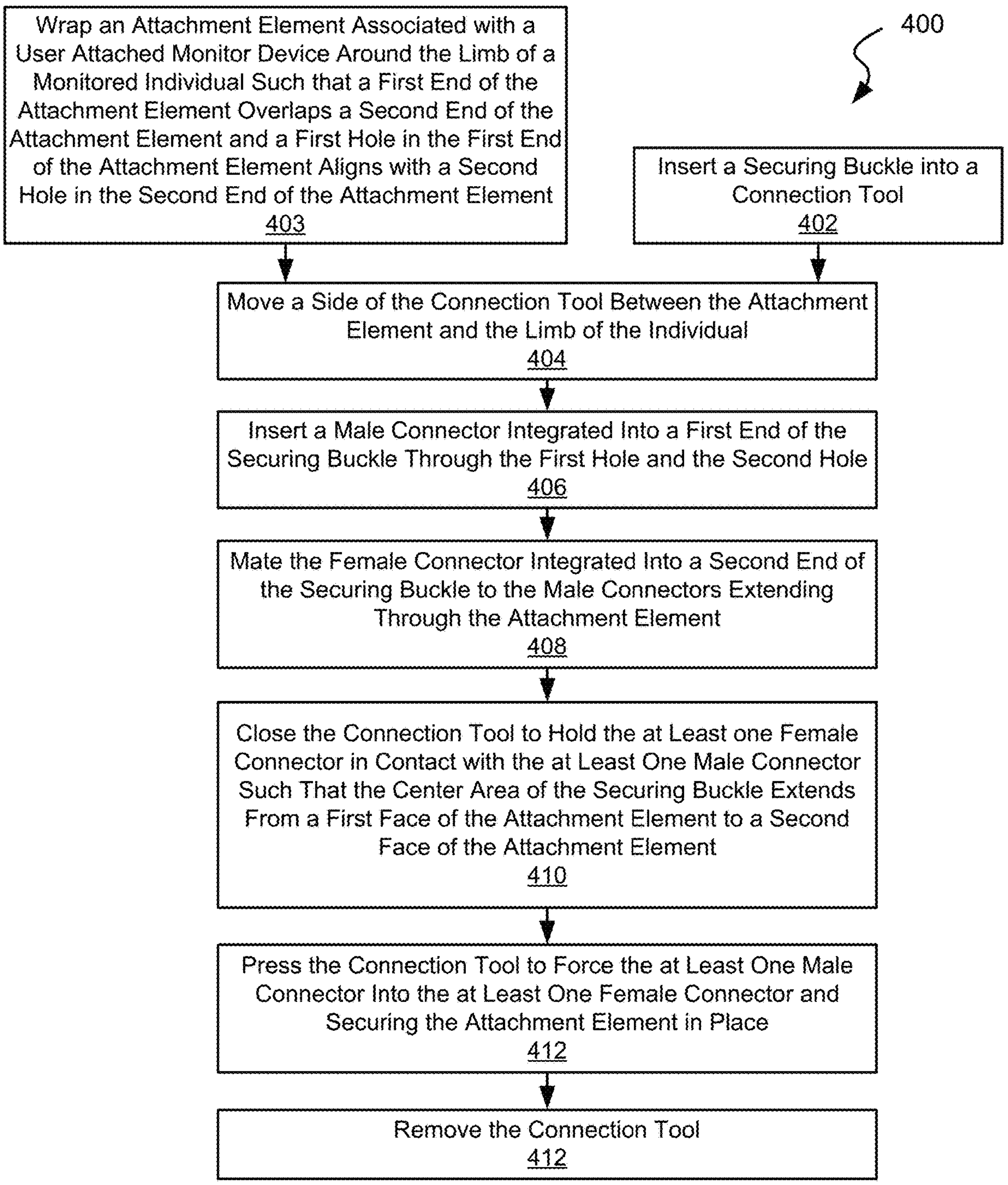
FIG. 4 is a flow diagram showing a method in accordance with some embodiments for securing a monitoring device to an individual.
Figure 5A:
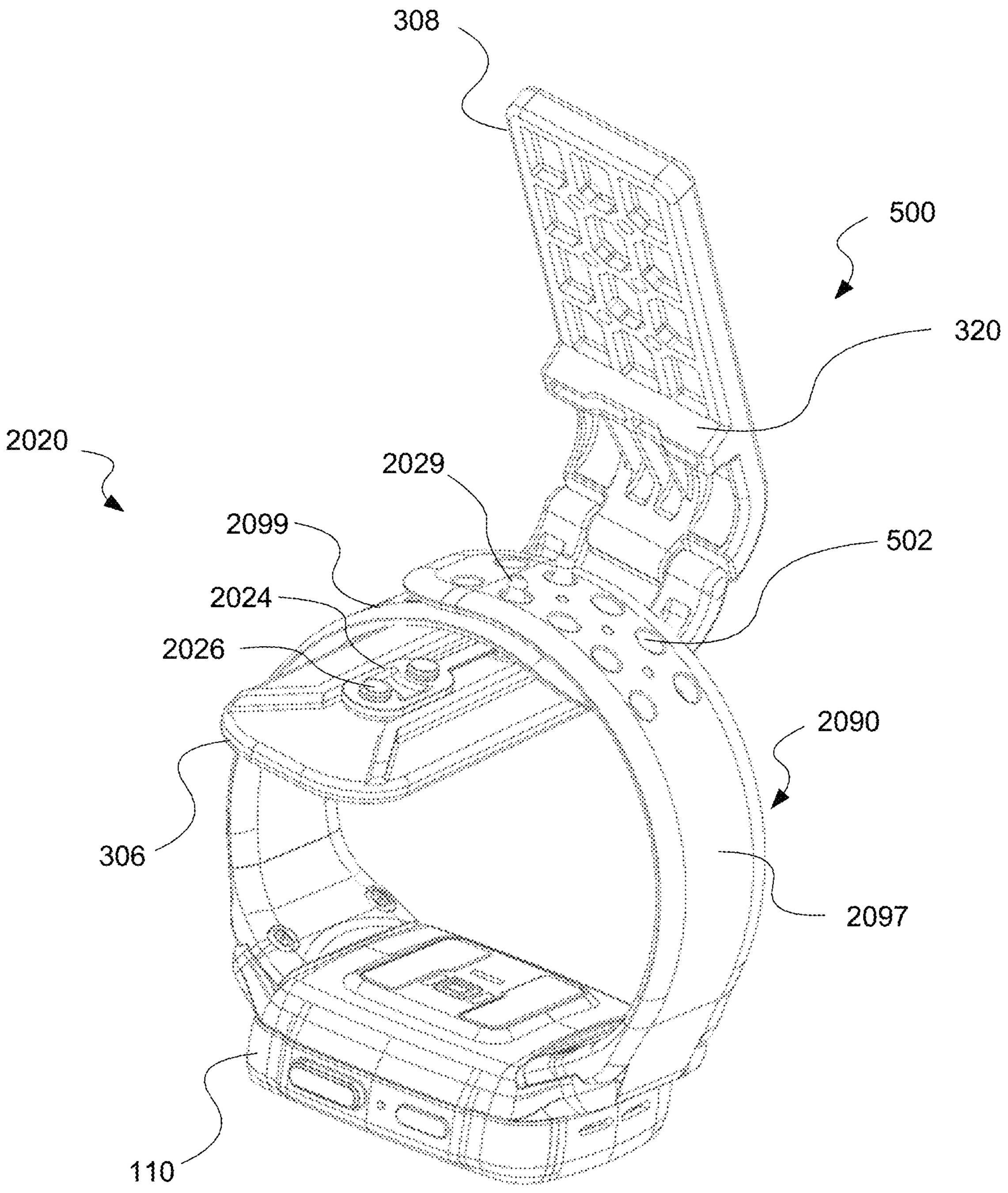
FIGS. 5A-5D depict various processes discussed in relation to FIG. 4.

Turning to FIG. 4, a flow diagram 400 shows a method in accordance with some embodiments for securing a monitoring device to an individual. Following flow diagram 400, an attachment element is wrapped around a limb of a monitored individual (block 403). The attachment element is secured to a user attached monitor device. Wrapping the attachment element around the limb of the monitored individual results in a first end of the attachment element overlapping a second end of the attachment element. A first hole in the first end of the attachment element aligns with a second hole in the second end of the attachment element such that an opening extends from one side of the first end of the attachment element to an opposite side of the second end of the attachment element. Turning to FIG. 5A, an example 500 showing first end 2097 overlapping second end 2099 of attachment element 2090 is shown. As shown, holes 502 in each of first end 2097 and second end 2099 are aligned to create openings extending through both first end 2097 and second end 2099.

Returning to FIG. 4, a securing buckle is inserted into the connection tool (block 402). This includes opening the connection tool to expose a channel in a side of the connection tool, where the channel tailored to accept the securing buckle and hold it in place. A side of the connection tool is moved between a limb of the individual and the attachment element wrapped around the limb of the monitored individual (block 404). The side of the connection tool between the limb of the monitored individual and the attachment element includes the first buckle end that includes one or more male connectors. The one or more male connectors integrated in the first end if the securing buckle are inserted through aligned holes in the overlapping first end and second end of the attachment element (block 406). Turning to FIG. 5A, example 500 shows male connector(s) 2029 integrated into second side 2028 of securing buckle 2020 inserted through holes 502 of first end 2097 and second end 2099 of attachment element 2090. Also show are female connectors 2026 integrated into second side 2024 of securing buckle 2020.

Figure 5B:
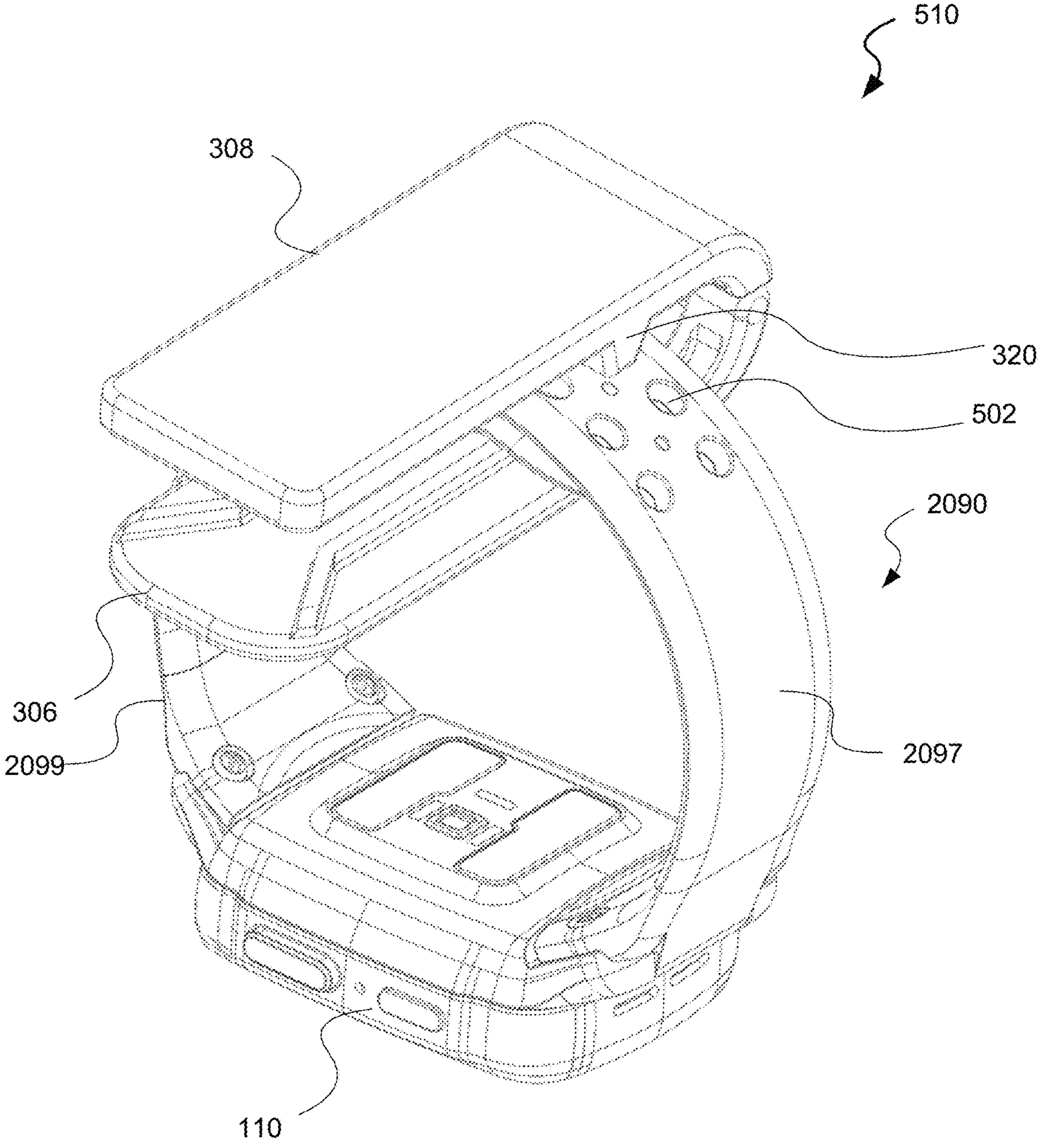
Figure 5C:
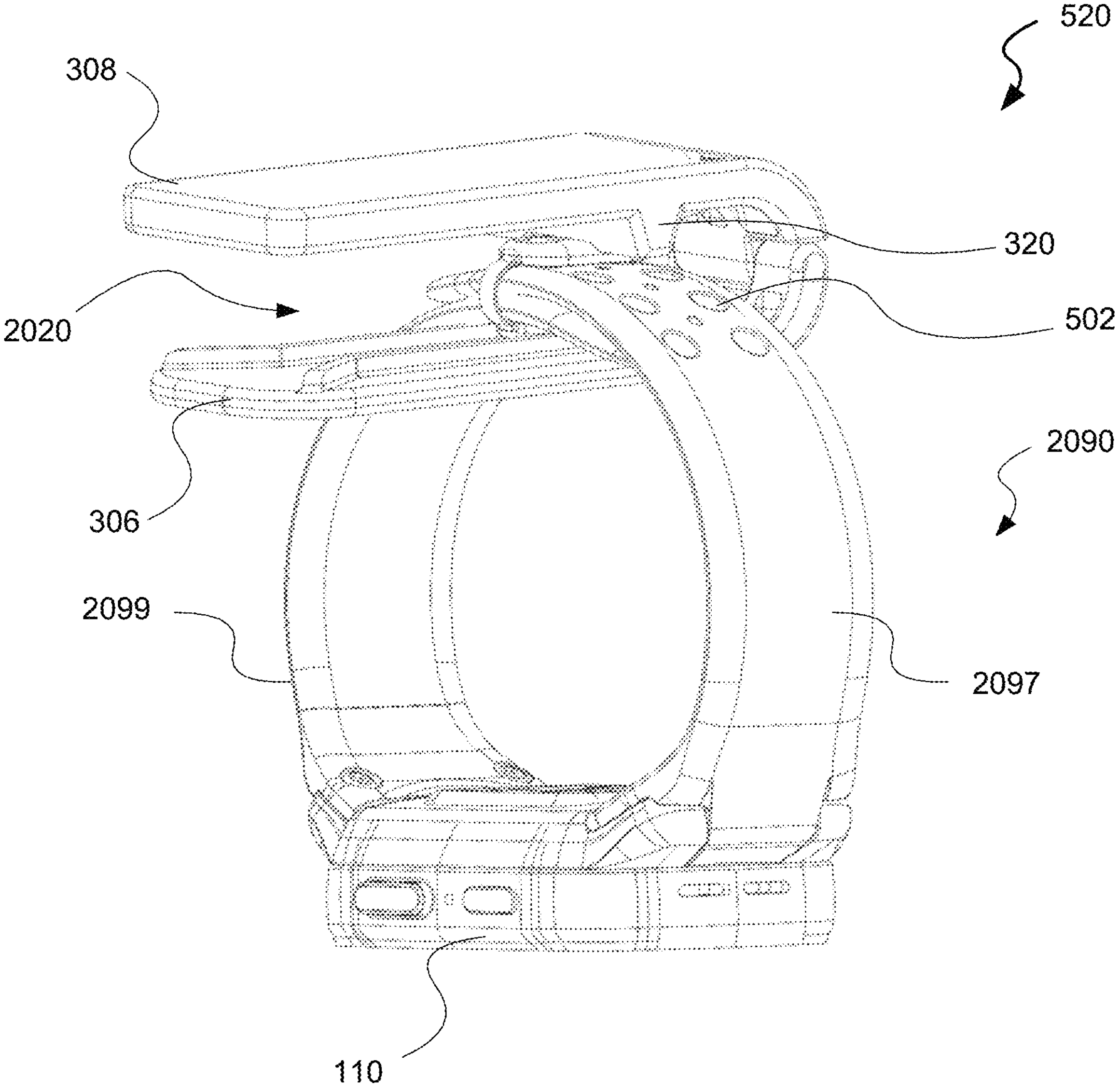

Returning to FIG. 4, the center of the securing buckle is bent over such that the one or more female connectors in one side of the second buckle are brought near a corresponding one of more male connectors extending through the attachment element (block 408). This results in mating the female connector(s) with the male connector(s), but that the union is not yet secure. The connection tool is closed by pivoting one end of the connection tool relative to the second end of the connection tool about an axis (block 410). Wen closed, the connection tool holds the at least one female connector in contact with the at least one male connector such that the center area of the securing buckle extends from a first face of the attachment element to a second face of the attachment element. Turning to FIG. 5B, an example 510 shows first side 308 moved relative to second side 306 such pressure element 320 is in contact with securing buckle 2020 (not shown). Turning to FIG. 5*c*, an example 520 shows a different angle from example 510 where pressure element 320 is in contact with securing buckle 2020. Returning to FIG. 4, the sides of the connection tool are pressed together to force the at least one male connector into the at least one female connector securing the attachment element in place (block 412). As the male connector(s) include a mushroom head, once the male connector(s) is forced through the female connector(s), the securing buckle cannot be moved without destroying either the male connector(s) or the female connector(s).

Figure 5D:
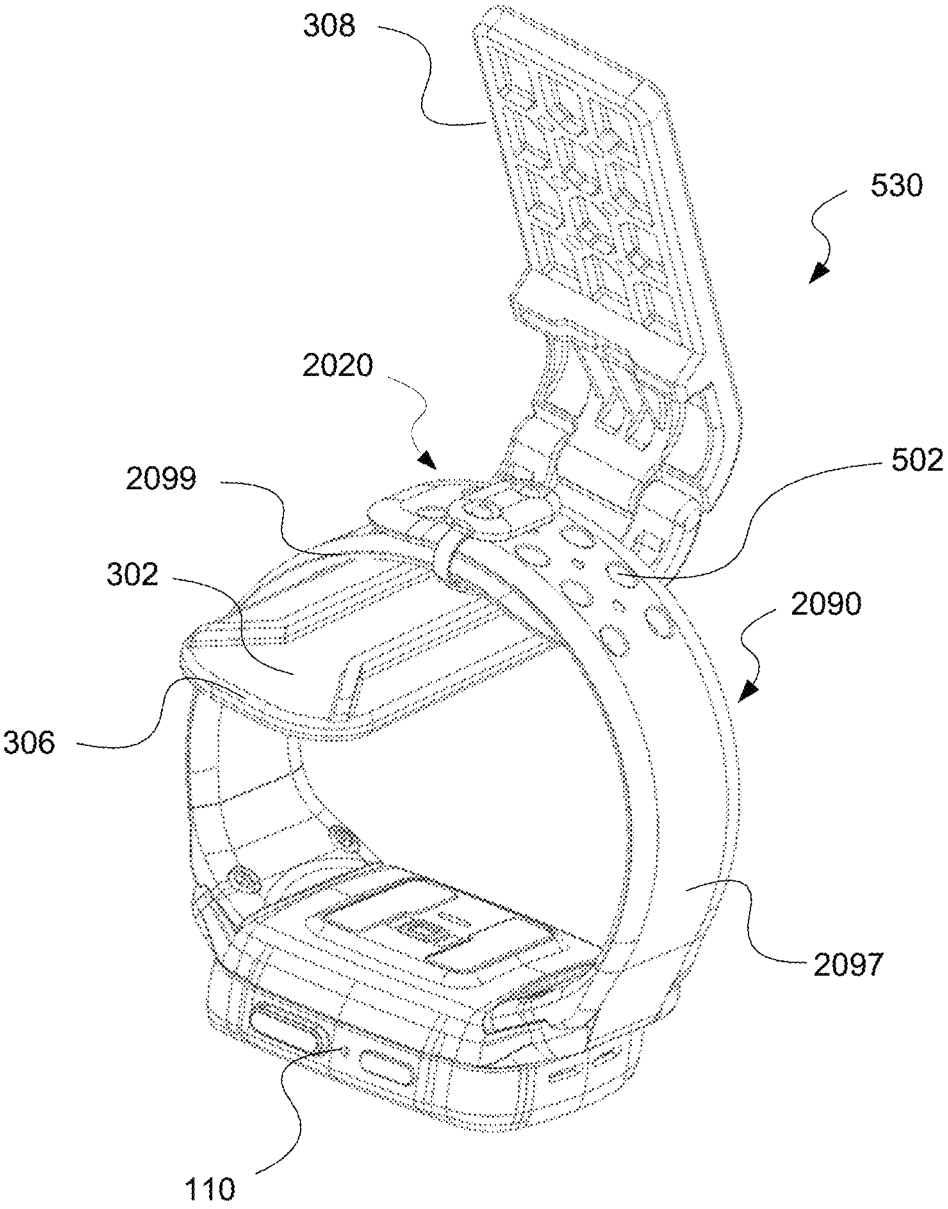

Once the securing buckle is secured to the attachment device, the connection tool is removed (block 412). Turning to FIG. 5D, an example 530 shows the connection tool being removed after securing buckle 2020 has been secured in place.

Figure 6:
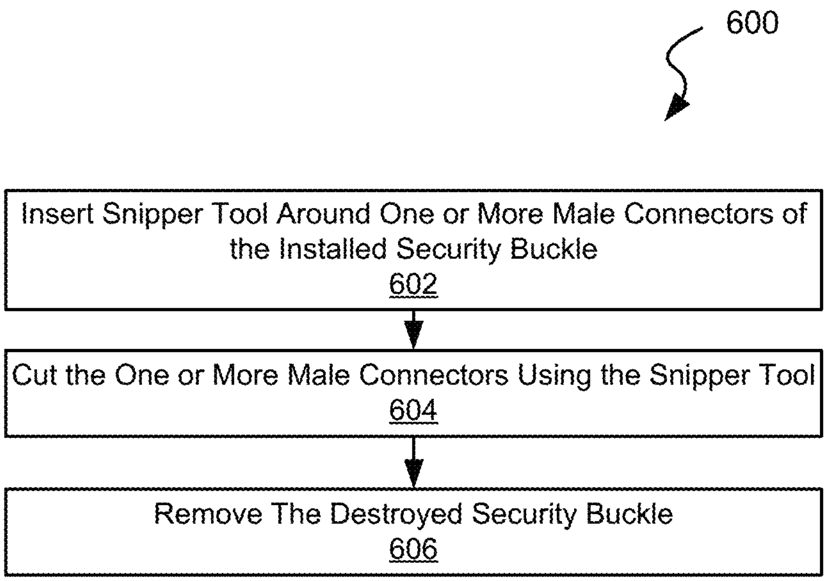
FIG. 6 is a flow diagram showing a method in accordance with various embodiments for removing a previously installed security buckle.
Figure 7A:
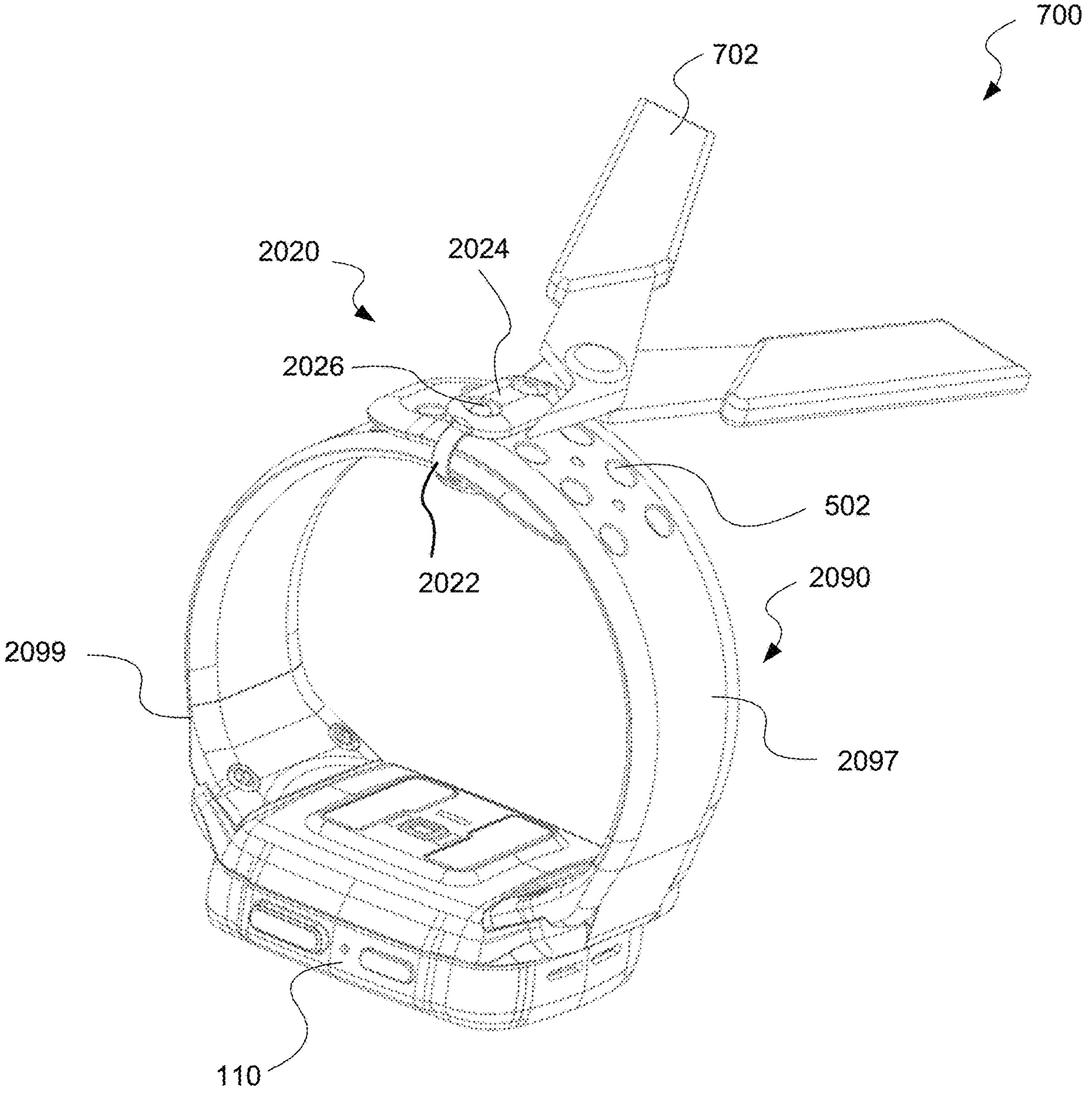
FIGS. 7A-7B depict various processes discussed in relation to FIG. 6.
Figure 7B:
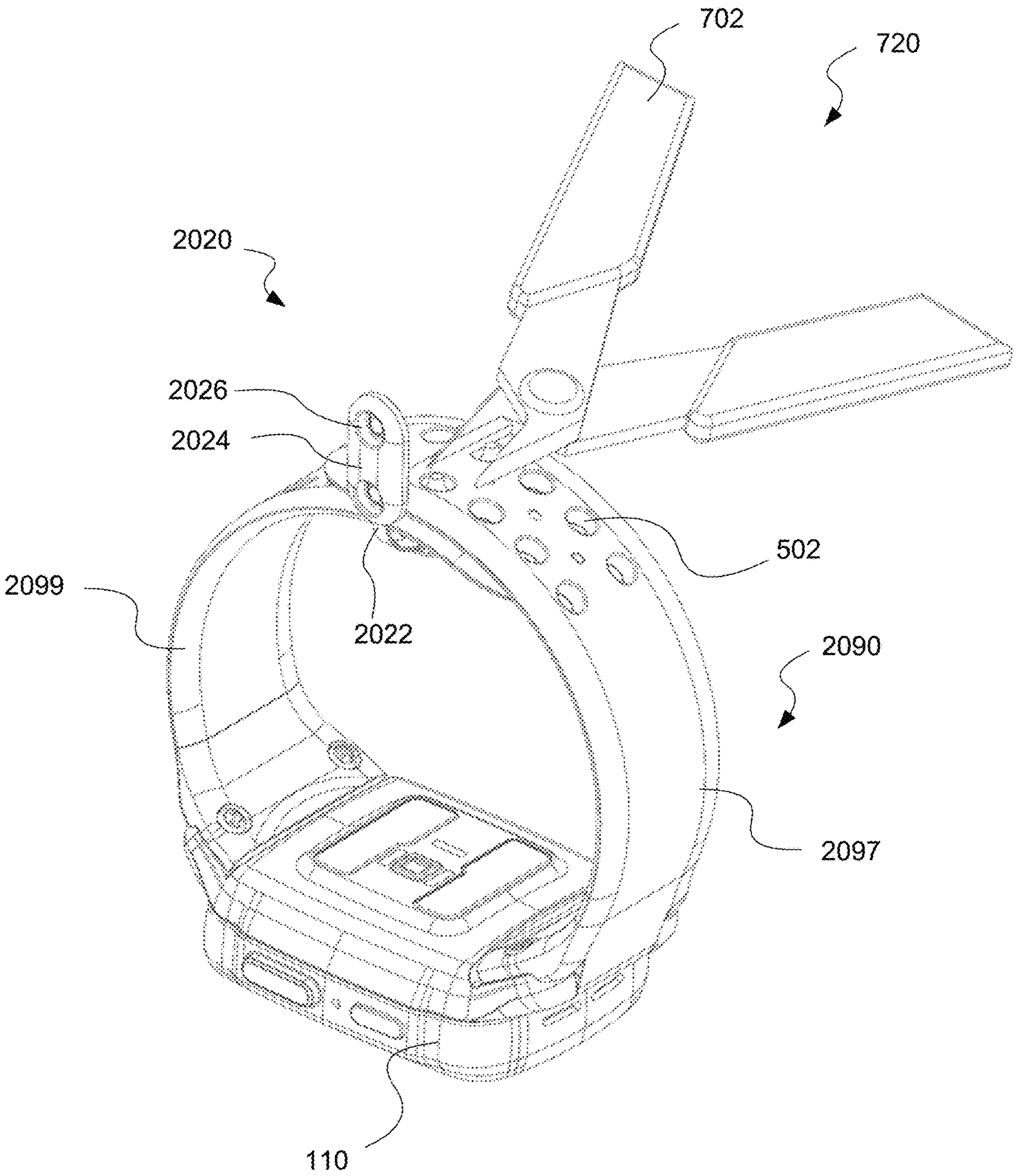
Figure 8A:
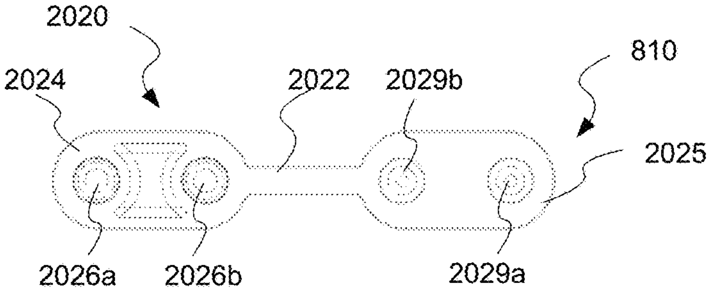
FIGS. 8A-8D show a securing buckle in accordance with some embodiments.
Figure 8B:
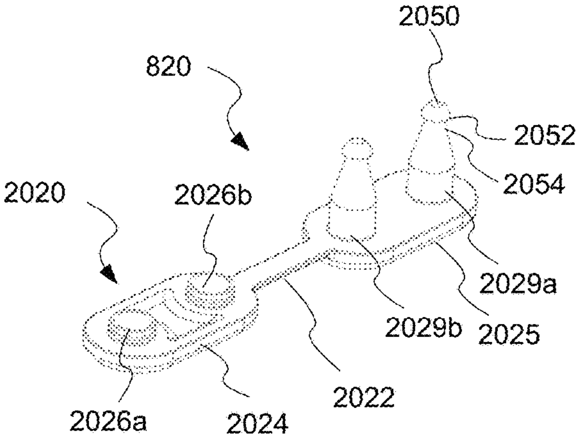
Figure 8C:
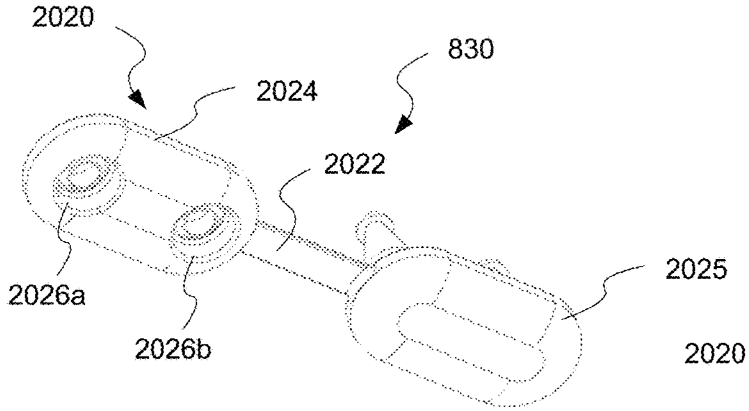
Figure 8D:
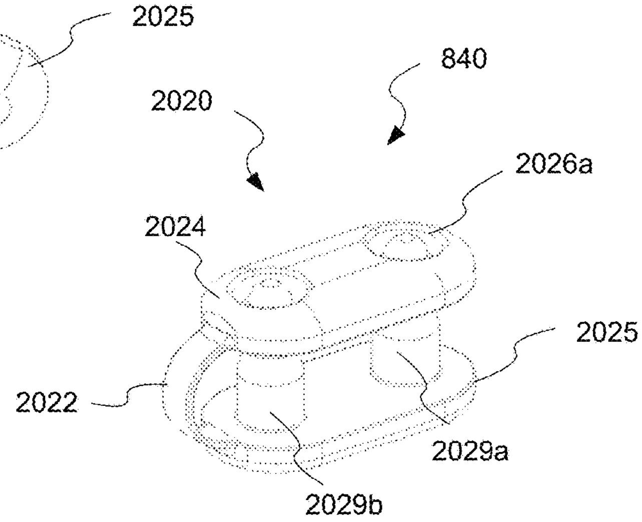

Turning to FIG. 6, a flow diagram 600 shows a method in accordance with various embodiments for removing a previously installed security buckle. Following flow diagram 600, a snipper tool is inserted around one or more male connector(s) of a previously installed security buckle (block 602). Turning to FIG. 7A, an example 700 shows a snipper tool 702 inserted such that when it is closed it will contact and cut one or more male connectors of security buckle 2020. Returning to FIG. 6, the snipper tool is closed such that it cuts the one or more male connector(s) (block 604). With the one or more male connectors cut (block 604), the destroyed security buckle is removed (block 606). This leaves the attachment element unsecured. Turning to FIG. 7B, an example 720 shows security buckle 2020 after the male connectors have been cut and before security buckle 2020 is pulled away from attachment element 2090.

Turning to FIGS. 8A-8D, multiple views 810, 820, 830, 840 are shown of security buckle 2020. In some embodiments, security buckle 2020 is molded from a pliable plastic. Based upon the disclosure provided herein, one of ordinary skill in the art will recognize other materials from which security buckle 2020 may be made. As shown, security buckle 2020 includes first side 2025 having at least one male connector 2029 integrated therewith. While the depicted embodiment includes two male connectors 2029*a*, 2029*b*, other embodiments may include one, three, or more male connectors. Security buckle 2020 includes second side 2024 having at least one female connector 2026 integrated therewith. While the depicted embodiment includes two female connectors 2026*a*, 2026*b*, other embodiments may include one, three, or more female connectors. First side 2025 is connected to second side 2024 via a center area 2022. As shown, each male connector 2029 includes a tip area 2050 that is narrower at an end than at a first interim location 2052. Male connector 2029 is broader at first interim location 2052 than at a second interim location 2054. First interim location 2052 is closer to the tip or end 2050 than second interim location 2054.

Turning to FIG. 9, a monitoring device securing kit 900 is shown in accordance with various embodiments. Monitoring device securing kit 900 includes connection tool 300 packaged with a plurality of securing buckles 2020*a*, 2020*b*, 2020*c*. While monitoring device securing kit 900 is shown as including three securing buckles 2020, more ore fewer may be included.

In conclusion, the present invention provides for novel systems, devices, and methods for providing location information for a tracking device. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for securing a monitor device to a monitored individual, the method comprising:

inserting a securing buckle into a connection tool, wherein the connection tool includes a channel tailored to accept the securing buckle, wherein the securing buckle comprises a first buckle end and a second buckle end connected by a center area, wherein the first buckle end includes at least one male connector, and wherein the second buckle end includes at least one female connector;

moving the connection tool between a limb of the of the monitored individual and an attachment element of the monitoring device, wherein the attachment element of the monitoring device is connected to the monitoring device and surrounds the limb of the monitored individual;

inserting the at least one male connector through a hole in the attachment element;

closing the connection tool to hold at least one female connector in contact with the at least one male connector, wherein the center area of the securing buckle extends from a first face of the attachment element to a second face of the attachment element; and pressing the connection tool to force the at least one male connector into the at least one female connector and securing the attachment element in place.

2. The method of claim 1, wherein the securing buckle has a shape defined by a combination of the first buckle end, the second buckle end, and the center area; and wherein the first buckle end and the second buckle end are both wider than the center area.

3. The method of claim 2, wherein the channel tailored to accept the securing buckle includes a first channel area, a second channel area, and a center channel area extending between the first channel area and the second channel area; and wherein the center channel area is narrower than either of the first channel area or second channel area.

4. The method of claim 3, wherein the first channel area corresponds in size to the first buckle end; wherein the second channel area corresponds in size to the second buckle end; and wherein the center channel area corresponds in size to the center area.

5. The method of claim 1, wherein the attachment element has a first attachment element end and a second attachment element end, wherein the first attachment element end includes at least a first hole, wherein the second attachment element end includes at least a second hole, and wherein the hole in the attachment element includes the first hole and the second hole.

6. The method of claim 5, the method further comprising:
wrapping the attachment element around the limb of the individual and aligning the first attachment element end with the second attachment element end such that the first attachment element hole is adjacent the second attachment element hole.

7. The method of claim 5, wherein the at least one male connector is a first male connector, wherein the at least one female connector is a first female connector, wherein the first buckle end includes a second male connector, wherein the second buckle end includes a second female connector, wherein the hole is a first hole, wherein the attachment element comprises a second hole, the method further comprising:
inserting the second male connector through the second hole in the attachment element; and
wherein closing the connection tool brings the first female connector into contact with the first male connector and the second female connector into contact with the second male connector.

8. The method of claim 1, wherein the at least one male connector includes a tip area that is narrower at an end of the at least one male connector than at a first interim location along the at least one male connector, wherein the at least one male connector is broader at the first interim location than at a second interim location along the at least one male connector, and wherein the first interim location is closer to the end of the at least one male connector than the second interim location.

9. The method of claim 8, wherein the first interim location is broader than an opening in the at least one female connector, and wherein upon pressing the connection tool to force the at least one male connector into the at least one female connector forces the first interim location through the at least one female connector such that the at least one male connector cannot be removed from the at least one female connector without damaging the at least one male connector.

10. The method of claim 8, wherein the first interim location is broader than an opening in the at least one female connector, and wherein upon pressing the connection tool to force the at least one male connector into the at least one female connector forces the first interim location through the at least one female connector such that the at least one male connector cannot be removed from the at least one female connector without damaging at least one of: the at least one male connector, the at least one female connector, or the attachment element.

11. The method of claim 1, wherein the monitoring device comprises a location detection circuit configured to determine a location of the monitoring device.

12. The method of claim 11, wherein the location detection circuit supports one or more location determination processes selected from a group consisting of: a global navigation satellite system based location detection, an advanced forward link trilateration based location detection, and a WiFi based location detection.

13. The method of claim 1, wherein at least a central portion of the at least one male connector is electrically conductive and configured to complete an electrical connection from one location of the monitoring device to another end of the monitoring device.

14. A monitoring device securing kit, the system comprising:
a plurality of securing buckles, wherein each of the plurality of securing buckles comprise:
a first end comprising a first male connector and a second male connector
a second end comprising a first female connector and a second female connector;
a center area extending between the first end and the second end, wherein the center area connects the first end to the second end; and
wherein the first male connector includes a tip area that is narrower at an end of the first male connector than at a first interim location along the first male connector, wherein the first male connector is broader at the first interim location than at a second interim location along the first male connector, and wherein the first interim location is closer to the end of the first male connector than the second interim location;
a connection tool, wherein the connection tool is a clamping device where a first end of the connection tool moves relative to a second end of the connection tool about an axis, wherein the connection tool includes a channel tailored to accept a securing buckle, wherein a first portion of the channel is configured to receive the first end of the securing buckle and is in the first end of the connection tool, and wherein a second portion of the channel is configured to receive a second end of the securing buckle and is in the second end of the connection tool.

15. The monitoring device securing kit of claim 14, wherein the first interim location is broader than an opening in the first female connector, and wherein upon pressing the connection tool to force the first male connector into the first female connector forces the first interim location through the first female connector such that the first male connector cannot be removed from the first female connector without damaging the first male connector.

16. The monitoring device securing kit of claim 14, wherein the first interim location is broader than an opening in the first female connector, and wherein upon pressing the connection tool to force the first male connector into the first female connector forces the first interim location through the first female connector such that the first male connector cannot be removed from the first female connector without damaging the first female connector.

17. A method for securing a monitor device to a monitored individual, the method comprising:
providing a monitoring device, wherein the monitoring device comprises:
a location detection circuit configured to determine a location of the monitoring device;
a wireless transmitter configured to transmit the location of the monitoring device to a recipient;
a battery supplying power to the location detection circuit and the transmitter; and
an attachment element having a first attachment element end and a second attachment element end, wherein the first attachment element end has a first attachment element hole and the second attachment element end has a second attachment element hole;
inserting a securing buckle into a connection tool, wherein the connection tool includes a channel tailored to accept the securing buckle, wherein the securing buckle comprises a first buckle end and a second buckle end connected by a center area, wherein the first buckle end includes at least one male connector, and wherein the second buckle end includes at least one female connector;

moving the connection tool and the attachment element such that the attachment element is around a limb of a monitored individual, and the connection tool is between the limb of the of the monitored individual and the attachment element of the monitoring device;

inserting the at least one male connector through the first attachment element hole and the second attachment element hole;

closing the connection tool to hold the at least one female connector in contact with the at least one male connector, wherein the center area of the attachment element extends from a face of the first end of the attachment element to a face of the second end of the attachment element; and pressing the connection tool to force the at least one male connector into the at least one female connector and securing the attachment element in place.

18. The method of claim 17, wherein the at least one male connector is a first male connector, wherein the at least one female connector is a first female connector, wherein the first end includes a second male connector, wherein the second end includes a second female connector, wherein the hole is a first hole, wherein the attachment element comprises a second hole, the method further comprising:

inserting the second male connector through the second hole in the attachment element; and wherein closing the connection tool brings the first female connector into contact with the first male connector and the second female connector into contact with the second male connector.

19. The method of claim 17, wherein the securing buckle has a shape defined by a combination of the first buckle end, the second buckle end, and the center area; and wherein the first buckle end and the second buckle end are both wider than the center area.

20. The method of claim 17, wherein the at least one male connector includes a tip area that is narrower at an end of the at least one male connector than at a first interim location along the at least one male connector, wherein the at least one male connector is broader at the first interim location than at a second interim location along the at least one male connector, and wherein the first interim location is closer to the end of the at least one male connector than the second interim location.

* * * * *